(12) United States Patent
Moore

(10) Patent No.: US 8,743,403 B2
(45) Date of Patent: Jun. 3, 2014

(54) CERTIFIED PRINT ARCHIVING

(75) Inventor: John A Moore, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 158 days.

(21) Appl. No.: 13/470,423

(22) Filed: May 14, 2012

(65) Prior Publication Data

US 2013/0301078 A1    Nov. 14, 2013

(51) Int. Cl.
    *G06F 3/12*    (2006.01)
(52) U.S. Cl.
    USPC ........... 358/1.15; 358/403; 358/1.9; 382/159; 382/305
(58) Field of Classification Search
    None
    See application file for complete search history.

(56) References Cited

U.S. PATENT DOCUMENTS

| 7,826,089 | B2 * | 11/2010 | Inoue | 358/1.9 |
| 8,339,680 | B2 * | 12/2012 | Privault et al. | 358/403 |
| 2002/0105674 | A1 * | 8/2002 | Nomura et al. | 358/1.15 |
| 2003/0007177 | A1 * | 1/2003 | Ferlitsch | 358/1.15 |
| 2007/0041042 | A1 * | 2/2007 | Tamai et al. | 358/1.15 |
| 2008/0259408 | A1 * | 10/2008 | Fukuda | 358/442 |
| 2009/0290178 | A1 * | 11/2009 | Koike | 358/1.9 |
| 2012/0120431 | A1 * | 5/2012 | Kino | 358/1.13 |
| 2012/0182571 | A1 * | 7/2012 | Wu et al. | 358/1.14 |

* cited by examiner

*Primary Examiner* — Satwant Singh

(57) ABSTRACT

A method for archiving is disclosed. The method comprises generating a first image file corresponding to an original print using a first printer placed at a first location. Further, the first image file is transmitted from the first location to a second printer placed at a second location. The method further includes generating a duplicate print corresponding to the first image file at the second location. Further, a quality of the first image file is compared with a quality of the duplicate print, and the duplicate print is archived based on the comparison.

26 Claims, 7 Drawing Sheets

CERTIFIED PRINT ARCHIVING

BACKGROUND

In many business processes, there arises a necessity to archive paper records like signed contracts, customer correspondence, and tax-related financial records for future reference. The paper records are often stored locally for a period, and then shipped off to remote document warehouse facilities for long-term archiving. Shipping the paper records for archiving incurs a lot of money and time.

SUMMARY

According to aspects illustrated herein, a method for archiving is disclosed. In an embodiment, the method includes generating a first image file corresponding to an original print. A first printer placed at a first location generates the first image file. The method further includes transmitting the first image file from the first location to a second printer placed at a second location. Further, the second printer generates a duplicate print corresponding to the first image file. A quality of the first image file is compared with a quality of the duplicate print. Further, the duplicate print is archived based on the comparison.

BRIEF DESCRIPTION OF DRAWINGS

The following detailed descriptions of the embodiments of the disclosure will be better understood when read with reference to the appended drawings. The disclosure is illustrated by way of example, and is not limited by the accompanying figures, in which like references indicate similar elements.

DETAILED DESCRIPTION

Various terms that appear in the following description have been defined below:

Print: A print corresponds to an image on a medium (such as paper), that is capable of being read directly through human eyes, perhaps with magnification. According to this disclosure, handwritten or partially handwritten image on a medium is considered as an original print. In an embodiment, a duplicate print corresponds to an exact replica of the original print derived by scanning, printing, or both.

Printer: A printer encompasses any apparatus, such as a digital copier, bookmaking machine, facsimile machine, multi-function machine (performing scanning, emailing), and the like, which performs a print (original and/or duplicate) outputting function for any purpose in response to digital data sent thereto.

Printing: Printing may be defined as a process of making predetermined data available for printing. The predetermined data generates a print. According to this disclosure, printing includes, printing, micro printing, and microfilm printing—that are human readable, perhaps with magnification.

Image file: An image file is defined as a collection of data, including image data in any format, retained in an electronic form.

Scanning: Scanning is defined as recording an image on a print as digital data in any format, thereby creating an image file.

Quality of an original print (or) quality of a duplicate print: A quality of an original print (or) a quality of a duplicate print (according to this disclosure) corresponds to nature or genuineness of the original print (or) the duplicate print.

Quality of an image file: A quality of an image file (according to this disclosure) refers to nature or genuineness of the image file in terms of image clarity.

The disclosure can be best understood with reference to the detailed figures and description set forth herein. Various embodiments are discussed below with reference to the figures. However, those skilled in the art will readily appreciate that the detailed description given herein with respect to the figures is just for explanatory purposes as the method and the system extend beyond the described embodiments. For example, those skilled in the art will appreciate that, in light of the teachings presented, multiple alternate and suitable approaches can be realized, depending on the needs of a particular application, to implement the functionality of any detail described herein.

Figure 1:
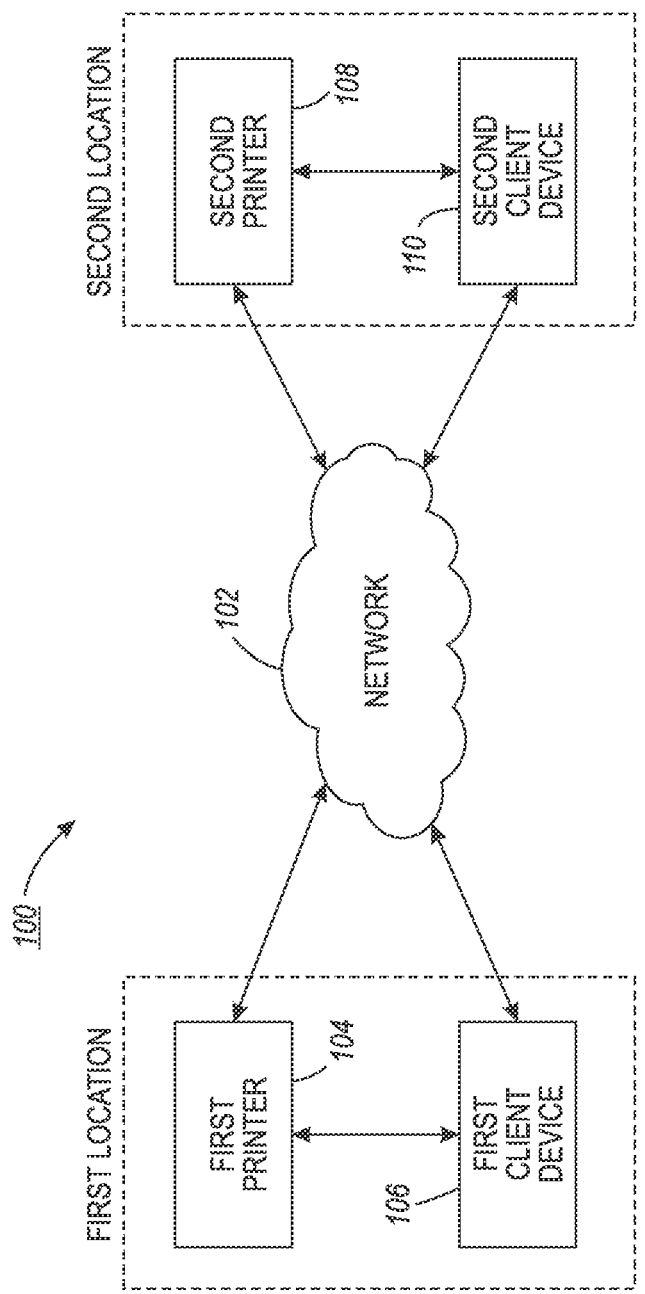
FIG. 1 is a system environment in which the disclosed embodiments can be implemented in accordance with an embodiment.

FIG. 1 illustrates a system environment 100 in which the disclosed embodiments can be implemented in accordance with an embodiment. The system environment 100 includes a network 102, a first printer 104, a first client device 106, a second printer 108, and a second client device 110. The first printer 104, the first client device 106, the second printer 108, and the second client device 110 communicate through the network 102.

The network 102 corresponds to a medium through which the various components such as the first printer 104, the first client device 106, the second printer 108, and the second client device 110 of the system environment 100 communicate with each other. Examples of the network 102 may include, but are not limited to, a Wireless Fidelity (Wi-Fi) network, a Wireless Universal Serial Bus (WUSB) or Bluetooth. Various components in the system environment 100 can connect to the network 102 in accordance with various communication protocols such as Transmission Control Protocol and Internet Protocol (TCP/IP), User Datagram Protocol (UDP), and IEEE 802.11n communication protocols.

The first printer 104 includes a first display having a first user interface associated with it. The first display is configured to display one or more options for printing, scanning, copying and the like to a first user at a first location.

The first client device 106 and the second client device 110 correspond to a computing device such as, but is not limited to, a Personal Digital Assistant (PDA), a smart phone, a tablet PC, a laptop, a personal computer, a mobile phone, and a Digital Living Network Alliance (DLNA)-enabled device.

In an embodiment, the first client device 106 and the second client device 110 are configured to extract and analyze data stored locally or in a storage medium associated with the first client device 106 and the second client device 110. Further, first client device 106 and the second client device 110 may extract data stored locally or extract data from the storage medium using various languages such as Structured Query Language (SQL), 4D Query Language, Object Query Language, and Stack-Based Query Language (SBQL).

In an embodiment, the first client device 106 communicates with the first printer 104 through a first internal network or through the network 102. In another embodiment, the second client device 110 communicates with the second printer 108 through a second internal network or through the network 102.

Examples of the first internal network and the second internal network may include, but are not limited to, a Wireless Fidelity (Wi-Fi) network, a Wireless Universal Serial Bus (WUSB) or Bluetooth.

In an embodiment, the first printer 104 and the first client device 106 can connect to the first internal network in accordance with various communication protocols such as Transmission Control Protocol and Internet Protocol (TCP/IP), User Datagram Protocol (UDP), and IEEE 802.11n communication protocols.

In an embodiment, the second printer 108, and the second client device 110 can connect to the second internal network in accordance with various communication protocols such as Transmission Control Protocol and Internet Protocol (TCP/IP), User Datagram Protocol (UDP), and IEEE 802.11n communication protocols.

The second printer 108 includes a second display having a second user interface associated with it. The second display is configured to display one or more options for printing, scanning, copying and the like to a second user at a second location.

Further, those ordinarily skilled in the art may appreciate that the disclosed embodiments in FIG. 1 can be extended to include a plurality of first printers, a plurality of first client devices, a plurality of second printers, and a plurality of second client devices. However, only one first printer, one first client device, one second printer, and one second client device has been shown for the sake of simplicity.

Figure 2:
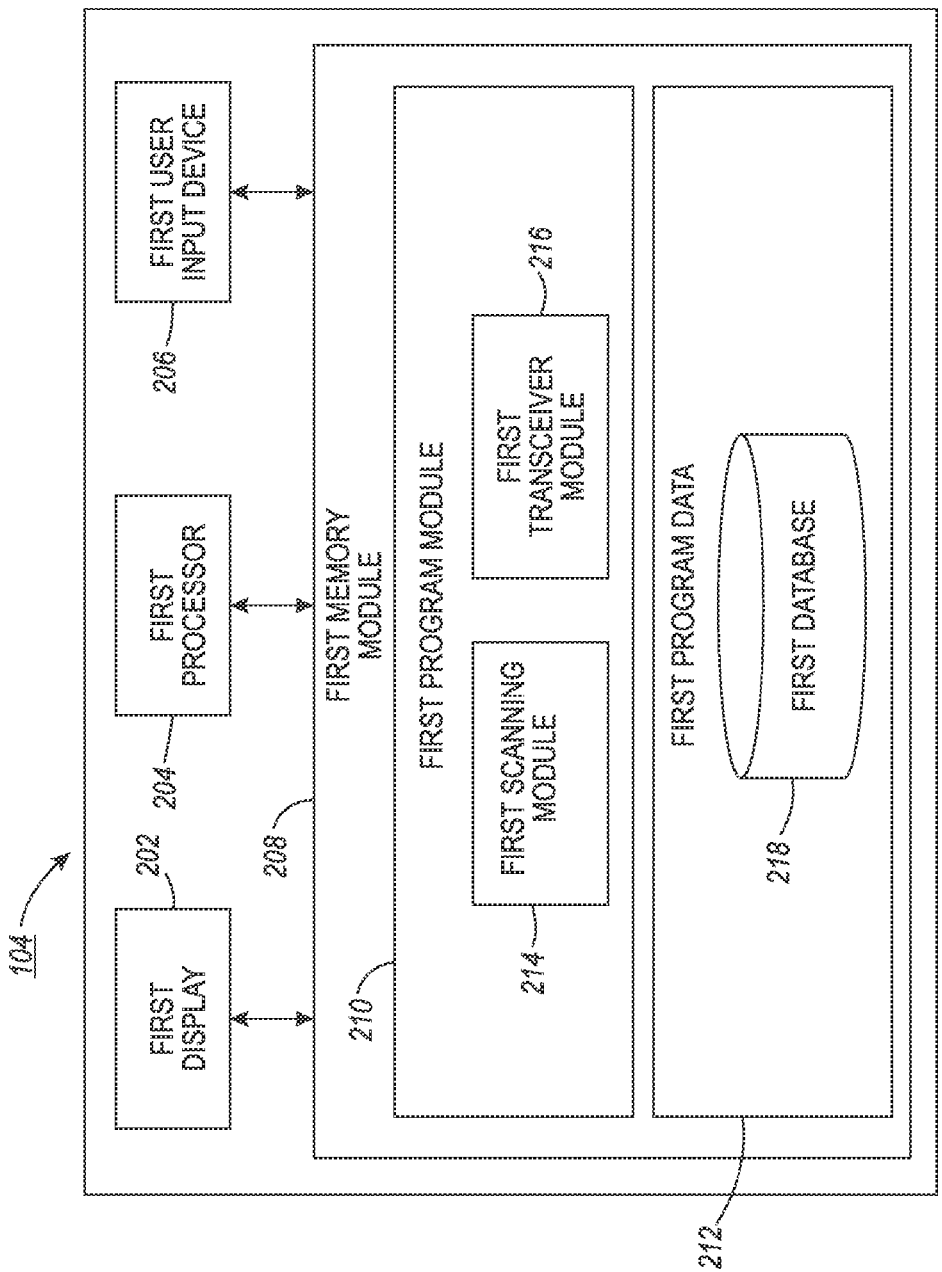
FIG. 2 is a system diagram that includes various modules associated with a first printer in accordance with an embodiment.

FIG. 2 is a system diagram that includes various modules associated with the first printer 104 in accordance with an embodiment. Further, FIG. 2 is explained in conjunction with FIG. 1. The first printer 104 includes a first display 202, a first processor 204, a first user input device 206, and a first memory module 208.

The first display 202 is configured to display a first user interface to a first user of the first printer 104. The first display 202 can be realized through several known technologies such as a Cathode Ray Tube (CRT) based display, a Liquid Crystal Display (LCD), a Light Emitting Diode (LED)-based display, and an Organic LED display technology. Further, the first display 202 can be a touch screen configured to receive a first user input. In an embodiment, the first display 202 is configured to display a first image file.

The first processor 204 is coupled with the first display 202, the first user input device 206, and the first memory module 208. Further, the first processor 204 is configured to execute a set of instructions stored in the first memory module 208. The first processor 204 can be realized through a number of processor technologies known in the art. Examples of the first processor 204 can be X86 processor, RISC processor, ASIC processor, CSIC processor, or any other processor. The first processor 204 fetches the set of instructions from the first memory module 208 and executes the set of instructions.

The first user input device 206 is configured to receive the first user input. Examples of the first user input device 206 may include, but are not limited to, a keyboard, a mouse, a joystick, a gamepad, a stylus, or a touch screen.

The first memory module 208 is configured to store a set of instructions or modules. Some of the commonly known first memory module implementations can be, but are not limited to, a Random Access Memory (RAM), a Read-Only Memory (ROM), a Hard Disk Drive (HDD), and a Secure Digital (SD) card. The first memory module 208 includes a first program module 210 and a first program data 212. The first program module 210 includes a set of instructions that can be executed by the first processor 204 to perform specific actions on the first printer 104. The first program module 210 further includes a first scanning module 214 and a first transceiver module 216. The first program data 212 includes a first database 218.

The first scanning module 214 is configured to generate the first image file corresponding to an original print at the first location. Further, the first scanning module 214 stores the first image file in the first database 218.

In an embodiment, the first transceiver module 216 is configured to establish and maintain communication between the first printer 104 and at least one of: the second printer 108, the first client device 106, and the second client device 110, at any instance. In an embodiment, the first transceiver module 216 is configured to transmit the first image file from the first location to the second location.

In an embodiment, the first transceiver module 216 is configured to transmit the first image file from the first location directly to the second printer 108 at the second location. In another embodiment, the first transceiver module 216 is configured to transmit the first image file from the first location to the second printer 108 through the first client device 106. In an alternate embodiment, the first transceiver module 216 is configured to transmit the first image file from the first location to the second printer 108 through the second client device 110. In a further embodiment, the first transceiver module 216 is configured to transmit the first image file to the second printer 108 through the first client device 106 and the second client device 110. Examples of the first transceiver module 216 can include, but are not limited to, an antenna, an Ethernet port, an HDMI port, a VGA port, a USB port or any port that can be configured to receive and transmit data from an external source. The first transceiver module 216 transmits and receives data in accordance with various communication protocols such as Transmission Control Protocol and Internet Protocol (TCP/IP), User Datagram Protocol (UDP), 2G, 3G, and 4G.

Figure 3:
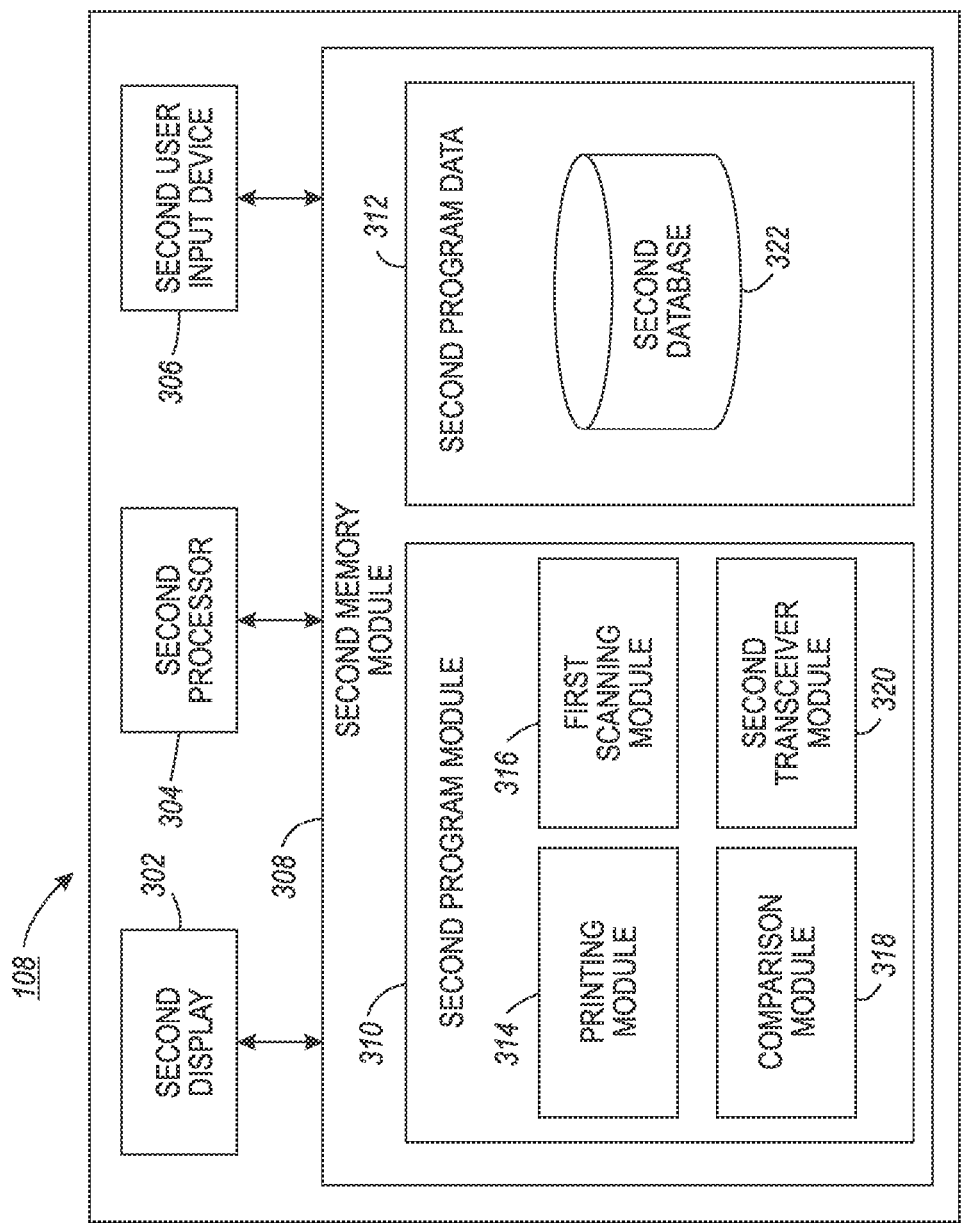
FIG. 3 is a system diagram that includes various modules associated with a second printer in accordance with an embodiment.

FIG. 3 is a system diagram that includes various modules associated with the second printer 108 in accordance with an embodiment. Further, FIG. 3 is explained in conjunction with FIG. 1 and FIG. 2. The second printer 108 includes a second display 302, a second processor 304, a second user input device 306, and a second memory module 308.

The second display 302 is configured to display a second user interface to a second user of the second printer 108. The second display 302 can be realized through several known technologies such as a Cathode Ray Tube (CRT)-based display, a Liquid Crystal Display (LCD), a Light Emitting Diode (LED)-based display, and an Organic LED display technology. Further, the second display 302 can be a touch screen configured to receive a second user input. In an embodiment, the second display 302 is configured to display a second image file.

The second processor 304 is coupled with the second display 302, the second user input device 306, and the second memory module 308. Further, the second processor 304 is configured to execute a set of instructions stored in the second memory module 308. The second processor 304 can be realized through a number of processor technologies known in the art. Examples of the second processor 304 can be X86 processor, RISC processor, ASIC processor, CSIC processor, or any other processor. The second processor 304 fetches the set of instructions from the second memory module 308 and executes the set of instructions.

The second user input device 306 is configured to receive the second user input. Examples of the second user input device 306 may include, but are not limited to, a keyboard, a mouse, a joystick, a gamepad, a stylus, or a touch screen.

The second memory module 308 is configured to store a set of instructions or modules. Some of the commonly known second memory module implementations can be, but are not limited to, a Random Access Memory (RAM), a Read-Only Memory (ROM), a Hard Disk Drive (HDD), and a Secure Digital (SD) card. The second memory module 308 includes a second program module 310 and second program data 312. The second program module 310 includes a set of instructions that can be executed by the second processor 304 to perform specific actions on the second printer 108. The second program module 310 further includes a printing module 314, a second scanning module 316, a comparison module 318, and a second transceiver module 320. The second program data 312 includes a second database 322.

The printing module 314 is configured to generate a duplicate print corresponding to the first image file. In an embodiment, the printing module 314 can be a printer based on various printing technologies such as, but not limited to, a toner-based printer, a liquid inkjet printer, a solid ink printer, a dye-sublimation printer, an inkjet printer, and the like.

The second scanning module 316 is configured to generate the second image file corresponding to the duplicate print at the second location. In an embodiment, the second scanning module 316 can be an image scanner based on various image-scanning technologies such as, but are not limited to, a drum scanner, a flatbed scanner, and the like. Further, the second scanning module 316 is configured to store the second image file in the second database 322.

The comparison module 318 is configured to compare a quality of the first image file with a quality of the duplicate print. Further, the comparison module 318 includes an image matching software application performing an image matching method. The image matching software application compares the quality of the first image file with a quality of the second image file based on a pre-defined threshold value.

In an embodiment, the comparison module 318 is located either in the second printer 108 or in the second client device 110.

In an embodiment, the second transceiver module 320 is configured to establish and maintain communication between the second printer 108 and at least one of: the first printer 104, the second client device 110 and the first client device 106, at any instance. In an embodiment, the second transceiver module 320 is configured to receive the first image file corresponding to the original print from the first location.

In an embodiment, the second transceiver module 320 is configured to directly receive the first image file from the first printer 104 at the first location. In another embodiment, the second transceiver module 320 is configured to receive the first image file corresponding to the original print from the first printer 104 through the first client device 106. In an alternate embodiment, the second transceiver module 320 is configured to receive the first image file corresponding to the original print from the first printer 104 through the second client device 110. Examples of the second transceiver module 320 can include, but are not limited to, an antenna, an Ethernet port, an HDMI port, a VGA port, a USB port or any port that can be configured to receive and transmit data from an external source. The second transceiver module 320 transmits and receives data in accordance with various communication protocols such as Transmission Control Protocol and Internet Protocol (TCP/IP), User Datagram Protocol (UDP), 2G, 3G, and 4G.

Figure 4:
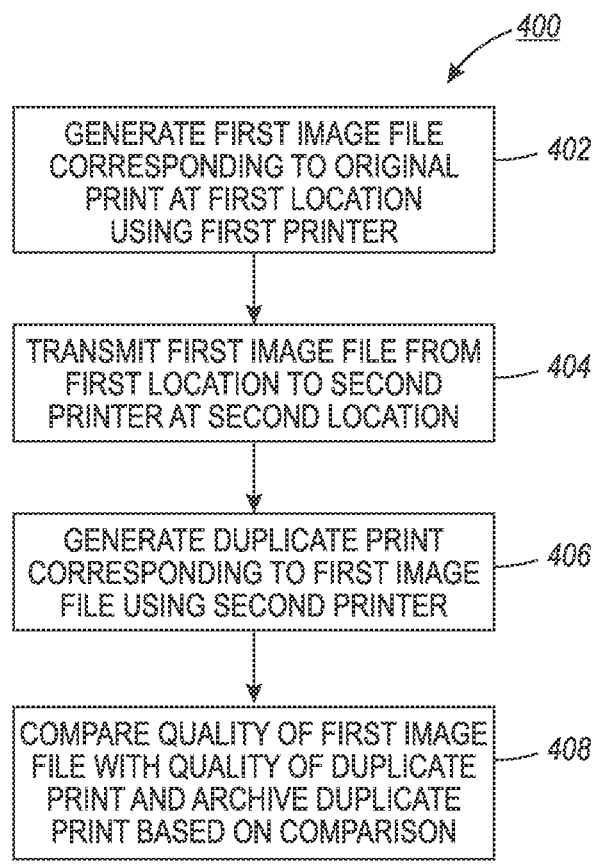
FIG. 4 is a flowchart representing a method for archiving in accordance with an embodiment.

FIG. 4 is a flowchart representing a method for archiving in accordance with an embodiment. FIG. 4 is explained in conjunction with FIG. 1, FIG. 2, and FIG. 3.

At step 402, the first image file corresponding to the original print is generated at the first location. In an embodiment, the first user at the first location uses the first printer 104 to scan the original print. The first scanning module 214 of the first printer 104 generates the first image file corresponding to the original print.

At step 404, the first image file is transmitted from the first location to the second printer 108 at the second location. In an embodiment, the first display 202 displays the first image file. The first user operating the first printer 104 compares a quality of the original print with the quality of the first image file. The first image file with a satisfactory quality is transmitted by the first transceiver module 216 to the second printer 108 at the second location.

In an alternate embodiment, the first transceiver module 216 transmits the first image file to the first client device 106. Further, the first image file is displayed on a display screen associated with the first client device 106. The first user operating the first client device 106 at the first location compares the quality of the original print with the quality of the first image file. The first image file with a satisfactory quality is subsequently transmitted to the second printer 108 at the second location.

It is evident for a person ordinarily skilled in the art that the transmission of the first image file from the first printer 104 to the second printer 108 can be via at least one of the first client device 106 or the second client device 110 or a combination of both, at any given instance.

In a further embodiment, the first image file is certified based on the quality of the first image file in comparison with the quality of the original print. The first user at the first location certifies the first image file by comparing the quality of the original print with the quality of the first image file. The certification is indicative of the quality of the first image file in comparison with the quality of the original print. In an embodiment, the certification is indicative of an authenticity of the first image file in comparison with the original print. The certification can be in the form of an encoded digital signature, a watermark, or the like. Subsequent to the certification given by the first user, the first image file is transmitted to the second printer 108.

At step 406, the duplicate print corresponding to the first image file is generated using the second printer 108. In another embodiment, the second transceiver module 320 of the second printer 108 receives the first image file from the first location. Further, the first image file is stored at the second database 322.

Further, the printing module 314 generates the duplicate print corresponding to the first image file. In an embodiment, the second user gives a print command to print the first image file. In another embodiment, the printing module 314 on receiving the first image file automatically generates the duplicate print.

At step 408, a second user located at the second location manually compares the quality of the first image file with the quality of the duplicate print. The second user further certifies the duplicate print based on the quality of the duplicate print in comparison with the quality of the first image file. The certification is indicative of the quality of the duplicate print in comparison with the quality of the first image file. In an embodiment, the certification is indicative of an authenticity of the duplicate print in comparison with the first image file. The certification can be in the form of an encoded digital signature, a watermark, or the like. Subsequent to the certification given by the second user, the duplicate print is archived. Further, the duplicate print having a satisfactory quality is archived.

In an embodiment, the first image file is displayed on a display screen of the second client device 110 placed at the second location. In an alternate embodiment, the first image file can be displayed on the second display 302 of the second printer 108.

Figure 5:
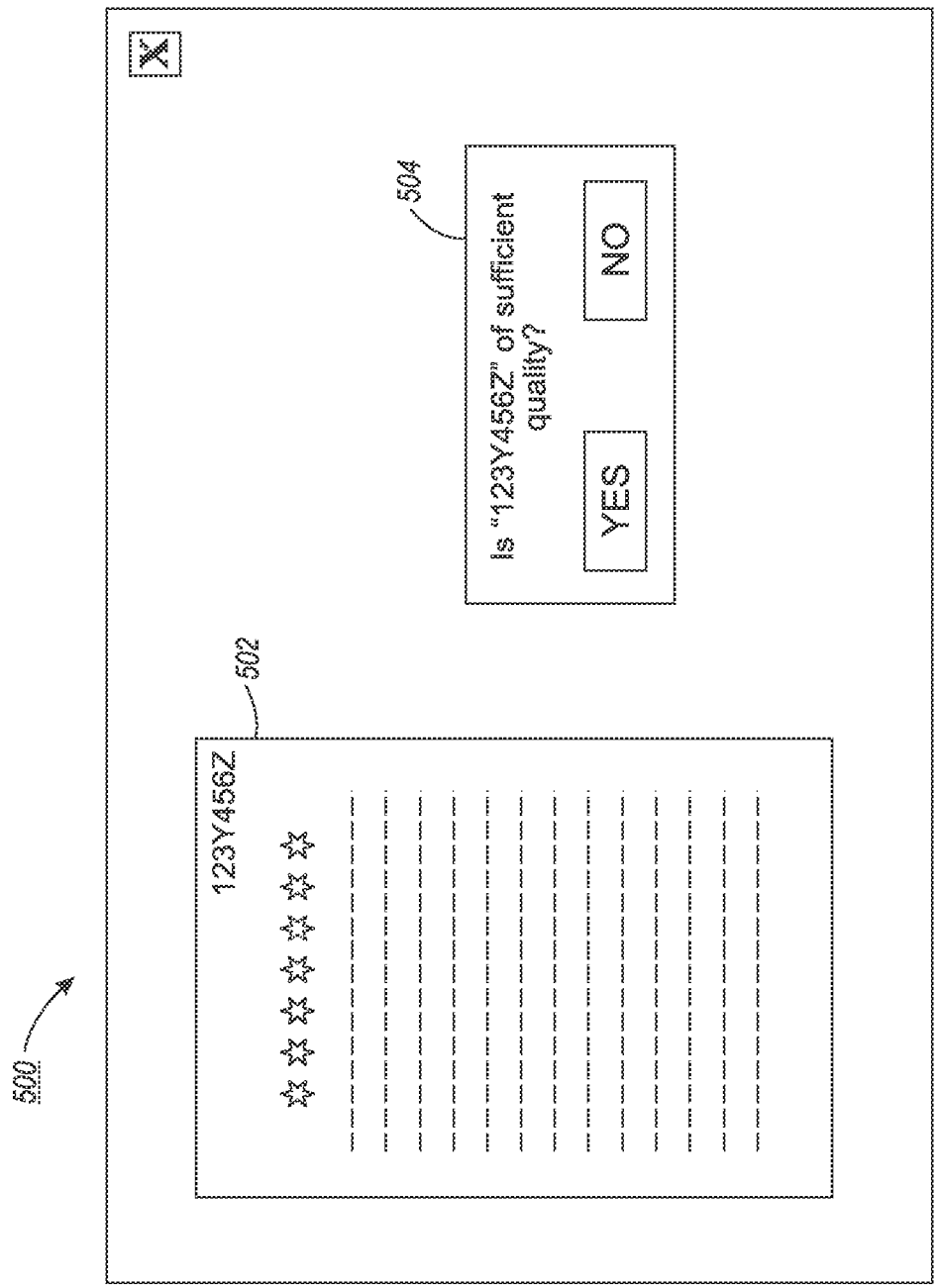
FIG. 5 is a first window displayed to a second user at a second location in accordance with an embodiment.

FIG. 5 is a first window 500 displayed either on the display screen of the second client device 110 or on the second display 302 of the second printer 108. The first window includes an example representation of first image file "123Y456Z" marked as 502, will hereinafter be referred to as "the first image file 502". The second user manually compares the quality of the first image file 502 with the quality of the duplicate print. If the duplicate print is of the satisfactory quality in comparison with the first image file 502, the second user clicks "YES" as shown in 504. Subsequently, the duplicate print is archived and a confirmation notification message is sent to the first user at the first location.

In an alternate embodiment, when the duplicate print is not of the satisfactory quality, the second user clicks "NO" as shown in 504. Subsequently, a report including details of failed archiving is sent to the first user.

In an embodiment, the report is generated based on the archiving of the duplicate print. In an embodiment, the comparison module 318 generates the report. The report includes an outcome of the step of comparing such as, but not limited to, a success or failure of the archiving, number of duplicate prints archived, and an encoded signature signifying a completion of the archiving.

Figure 6:
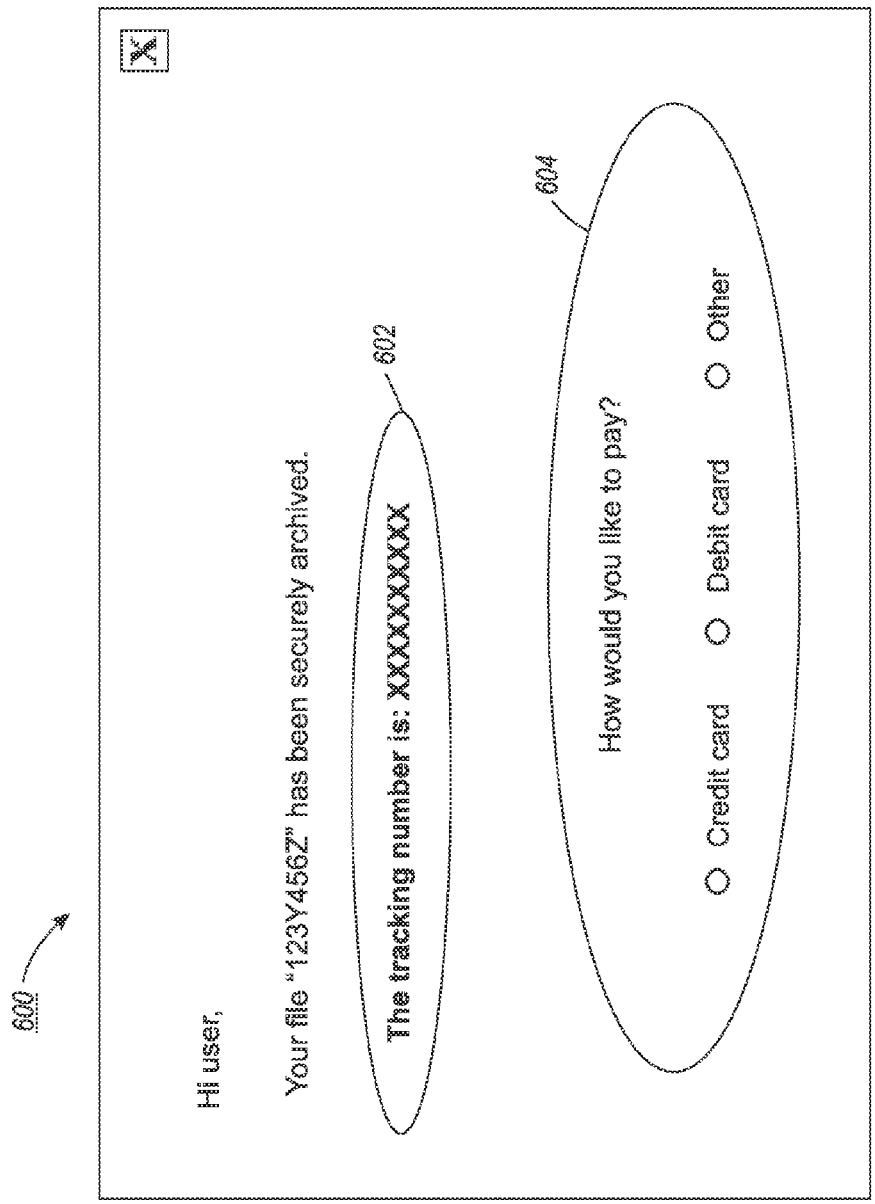
FIG. 6 is a second window displayed to a first user at a first location in accordance with an embodiment.

FIG. 6 is a second window 600 including the confirmation notification message. The second window 600 is displayed either on the display screen of the first client device 106 or on the first display 202. The second window 600 includes the confirmation notification message indicating successful archival of the duplicate print. In an embodiment, the second window 600 includes a tracking number depicted as 602. The tracking number is associated with the archived duplicate print.

In another embodiment, the second window 600 includes information regarding payment, depicted in 604. The first user can use various payment options such as, debit cards, credit cards and the like to make payment associated with the archived duplicate print.

In an embodiment, at step 408, during the comparison of the quality of the original print with the quality of the first image file performed at the first location, a window similar to the first window 500 (refer to FIG. 5) can be displayed. The window can be either displayed on the display screen of the first client device 106 or on the first display 202. The first user can confirm that the quality of the first image file 502 is of sufficient quality at the window similar to the first window 500 before transmitting it to the second location.

Figure 7:
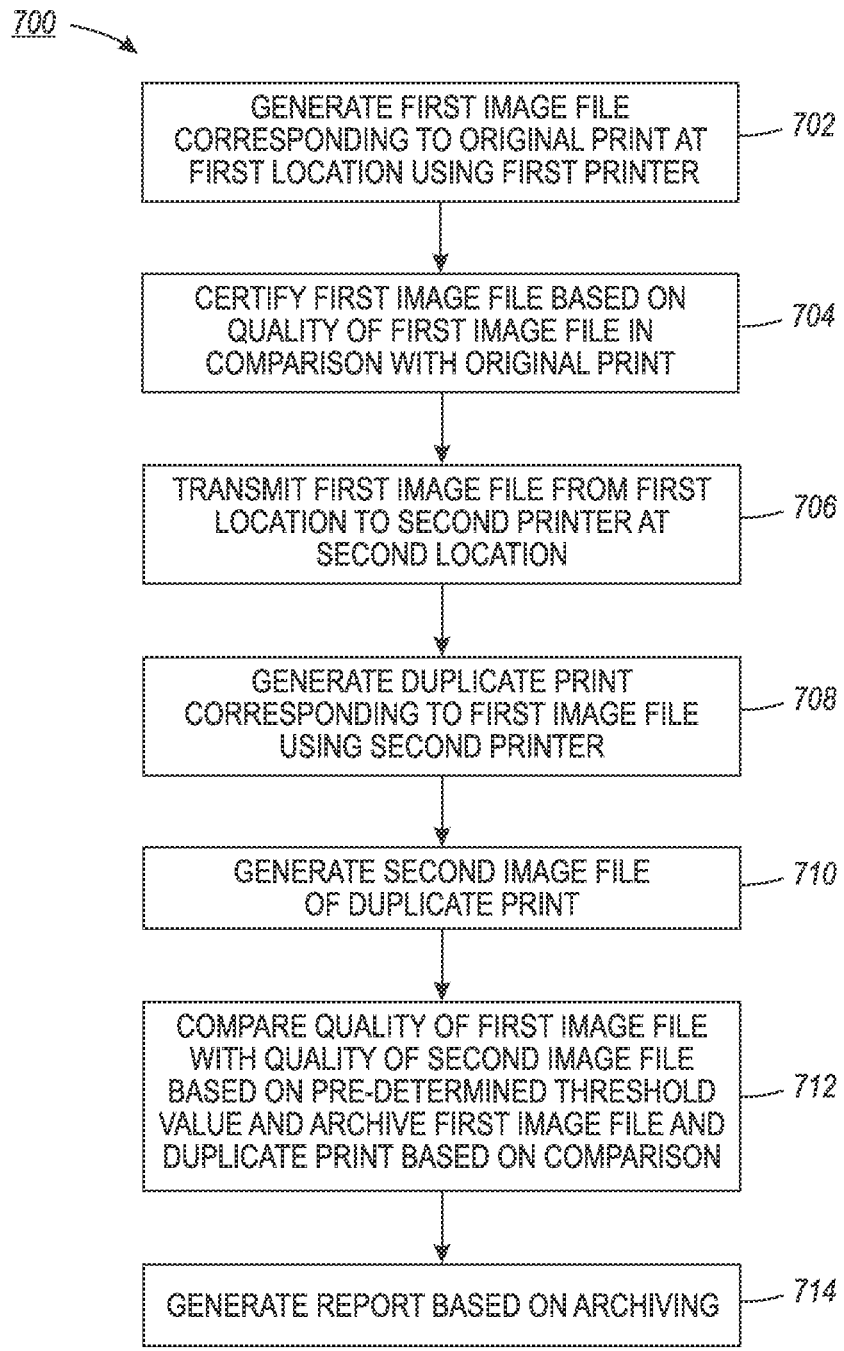
FIG. 7 is a flowchart representing a method for archiving, involving an automated comparison in accordance with an embodiment.

FIG. 7 is a flowchart representing a method for archiving involving an automated comparison in accordance with an embodiment. FIG. 7 is explained in conjunction with FIG. 1, FIG. 2, FIG. 3, FIG. 4, FIG. 5, and FIG. 6.

Steps 702, 706, and 708 are similar to steps 402, 404, and 406, respectively.

At step 704, the first image file 502 is certified based on the quality of the first image file 502 in comparison with the original print. In an embodiment, the first user at the first location compares the quality of the first image file 502 with the quality of the original print. Further, the first user certifies the first image file 502 based on the comparison. The first image file is then transmitted from the first location to the second location.

At step 710, the second scanning module 316 generates the second image file corresponding to the duplicate print. The second user at the second location initiates the generation of the second image file by providing a scan command to the second printer 108. Further, the second image file is stored at a server located at the second location or the storage medium associated with the second client device 110.

At step 712, the quality of the first image file 502 is compared with the quality of the second image file. The image matching software application installed in the comparison module 318 automatically compares the quality of the first image file 502 with the quality of the second image file based on a pre-determined threshold value. The pre-determined threshold value is indicative of a limit to which the quality of the second image file can vary, in comparison to the quality of the first image file 502.

In an embodiment, the comparison module 318 archives the first image file 502 with a satisfactory quality in the server or in the storage medium associated with the second client device 110.

In an embodiment, the comparison module 318 automatically certifies the first image file 502 based on the comparison. Further, the first image file 502 is used in various business process outsourcing processes for future transactions. In an embodiment, the duplicate print corresponding to the first image file 502 is further archived. The archiving of the duplicate print is done at a records management facility or the like.

Further, the second window 600 as shown in FIG. 6 is displayed either on the display screen of the first client device 106 or on the first display 202. The second window 600 is displayed subsequent to the archival of the first image file 502 and/or the duplicate print at the second location.

At step 714, a report is generated based on the archiving. In an embodiment, the comparison module 318 generates the report based on the archiving of the first image file 502 and the duplicate print. The report includes the outcome of the step of comparing such as, but is not limited to, a success or failure of the archiving, number of first image files and/or duplicate prints archived, and an encoded signature signifying completion of the archiving. The report is sent to the first client device 106 located at the first location.

In an embodiment, the comparison module 318 sends the confirmation notification message to the first client device 106 at the first location. The confirmation notification message is indicative of a successful archiving of the duplicate print and/or the first image file 502 as shown in 600 (refer to FIG. 7).

In an embodiment, subsequent to the reception of the confirmation notification message, the original print at the first location is safely destructed.

Thus, parallel archiving of the first image file and the duplicate print is carried out at the second location, which is remotely located in certain cases. Further, the first image file 502 and/or the duplicate print archived at the second location is tractable using the tracking number depicted in 602 (refer to FIG. 6). Further, the certification performed at the first location and the second location renders simple and secure archiving.

Furthermore, the certification is flexible allowing for manual and/or automatic certification. In an embodiment, the parallel archiving saves time and cost incurred by shipping the original print from first location to the second location.

According to this disclosure, the duplicate print can be in the form of a microprint, a micro film print, vinyl print, paper print, and/or the like. In an embodiment, the duplicate print may require magnification for viewing. Further, the duplicate print in the form of microprint, microfilm print, and the like reduces the amount of paper, ink, space, and the like consumed for archival purposes.

The disclosed methods and systems, as described in the ongoing description or any of its components, may be embodied in the form of a computer system. Typical examples of a computer system include—a general-purpose computer, a programmed microprocessor, a micro-controller, a peripheral integrated circuit element, and other devices or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive, etc. The storage device may also be other similar means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as LAN, MAN, WAN, and the Internet. The computer system facilitates inputs from a user through an input device, accessible to the system through an I/O interface.

The computer system executes a set of instructions that are stored in one or more storage elements, in order to process input data. The storage elements may also hold data or other information as desired. The storage element may be in the form of an information source or a physical memory element present in the processing machine.

The programmable or computer-readable instructions may include various commands that instruct the processing machine to perform specific tasks such as the steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to 'C', 'C++', 'Visual C++' and 'Visual Basic'. Further, the software may be in the form of a collection of separate programs, a program module with a larger program or a portion of a program module, as in the disclosure. The software may also include modular programming in the form of object-oriented programming. The processing of input data by the processing machine may be in response to user commands, results of previous processing or a request made by another processing machine. The disclosure can also be implemented in all operating systems and platforms including, but not limited to, 'iOS', 'Unix', DOS', 'Android', 'Symbian', and 'Linux'.

The programmable instructions can be stored and transmitted on a computer-readable medium. The disclosure can also be embodied in a computer program product comprising a computer-readable medium, with the product capable of implementing the above methods and systems, or the numerous possible variations thereof.

It will be appreciated that variants of the above disclosed and other features and functions, or alternatives thereof, may be combined to create many other different systems or applications. Various unanticipated alternatives, modifications, variations, or improvements therein may be subsequently made by those skilled in the art and are also intended to be encompassed by the following claims.

The claims can encompass embodiments in hardware, software, or a combination thereof.

What is claimed is:

1. A method for archiving comprising:
generating a first image file corresponding to an original print at a first location, wherein the first image file is generated by a first printer;
transmitting the first image file from the first location to a second printer placed at a second location;
generating a duplicate print corresponding to the first image file, wherein the duplicate print is generated by the second printer; and
comparing a quality of the first image file with a quality of the duplicate print, wherein the duplicate print is archived based on the comparison, wherein a report is generated based on archiving.

2. The method of claim 1, wherein the generating of the first image file further includes certifying the first image file based on the quality of the first image file in comparison to a quality of the original print, the certifying is performable by a user.

3. The method of claim 1, wherein the comparing further includes certifying the duplicate print based on the comparison, the certifying is performable by a user.

4. The method of claim 1, wherein the comparison of the quality of the first image file with the quality of the duplicate print is performable by a user.

5. The method of claim 1, wherein a confirmation notification message is sent based on the archiving.

6. The method of claim 1, wherein the generated report includes an encoded signature signifying a completion of the archiving.

7. A method for archiving comprising:
receiving a first image file corresponding to an original print, wherein the first image file is generated by a first printer;
generating a duplicate print of a first image file, wherein the duplicate print is generated by a second printer; and
comparing a quality of the first image file with a quality of the duplicate print, wherein the duplicate print is archived based on the comparison, wherein a report is generated based on the archiving.

8. The method of claim 7, wherein the comparing further includes certifying the duplicate print based on the comparison, wherein the certifying is performable by a user.

9. The method of claim 7, wherein the comparing is performable by a user.

10. The method of claim 7, wherein a confirmation notification message is sent based on the archiving.

11. The method of claim 7, wherein the generated report includes an encoded signature signifying a completion of the archiving.

12. The method of claim 7, wherein the duplicate print corresponds to a microprint, a microfilm print, a paper print, vinyl print, or a combination thereof.

13. A printer comprising:
a transceiver module configured to receive a first image file corresponding to an original print;
a printing module configured to generate a duplicate print corresponding to the received first image file;
a scanning module configured to generate a second image file of the duplicate print; and
a comparison module configured to compare a quality of the first image file with a quality of the second image file, wherein the comparison is performed using an image matching method, wherein the comparison module compares based on a pre-determined threshold value.

14. The printer of claim 13, wherein the first image file is archived on a server based on the quality of the first image file in comparison to the quality of the second image file.

15. The printer of claim 14, wherein the comparison module sends a confirmation notification message based on the archiving.

16. The printer of claim 14, wherein the comparison module generates a report based on the archiving.

17. The printer of claim 16, wherein the comparison module further applies an encoded signature in the report.

18. A non-transitory computer program product for use with a computer, the non-transitory computer program product comprising a computer readable program code embodied therein for archiving, the computer readable program code comprising:
program instruction means for generating a first image file corresponding to an original print at a first location, wherein the first image file is generated by a first printer;
program instruction means for transmitting the first image file from the first location to a second printer placed at a second location;
program instruction means for generating a duplicate print corresponding to the first image file, wherein the duplicate print is generated by the second printer;
program instruction means for generating a second image file corresponding to the duplicate print;
program instruction means for comparing a quality of the first image file with a quality of the second image file, wherein the comparison is performed using an image matching method; and
program instruction means for archiving the first image file based on the comparison, wherein a report is generated based on archiving.

19. The non-transitory computer program product of claim 18, wherein the generating of the first image file further includes certifying the first image file based on the quality of the first image file in comparison to a quality of the original print, the certifying is performable by a user.

20. The non-transitory computer program product of claim 18, wherein the program instruction means for comparing is based on a pre-determined threshold value.

21. The non-transitory computer program product of claim 18, wherein a confirmation notification message is sent based on the archiving.

22. The non-transitory computer program product of claim 18, wherein an encoded signature is applied in the report.

23. A non-transitory computer program product for use with a computer, the computer program product comprising a computer readable program code embodied therein for archiving, the computer readable program code comprising:
program instruction means for generating a duplicate print corresponding to a first image file, wherein the duplicate print is generated by a printer;
program instruction means for generating a second image file corresponding to the duplicate print;
program instruction means for comparing a quality of the first image file with a quality of the second image file, wherein the comparison is performed using an image matching method; and
program instruction means for archiving the first image file based on the comparison, wherein a report is generated based on archiving.

24. The non-transitory computer program product of claim 23, wherein the program instruction means for comparing is based on a pre-determined threshold value.

25. The non-transitory computer program product of claim 23, wherein a confirmation notification message is sent based on the archiving.

26. The non-transitory computer program product of claim 23, wherein an encoded signature is applied in the report.

* * * * *